Feb. 16, 1926. 1,573,618
C. F. LAGANKE
WINDSHIELD CLEANER
Filed Jan. 16, 1922 2 Sheets-Sheet 1
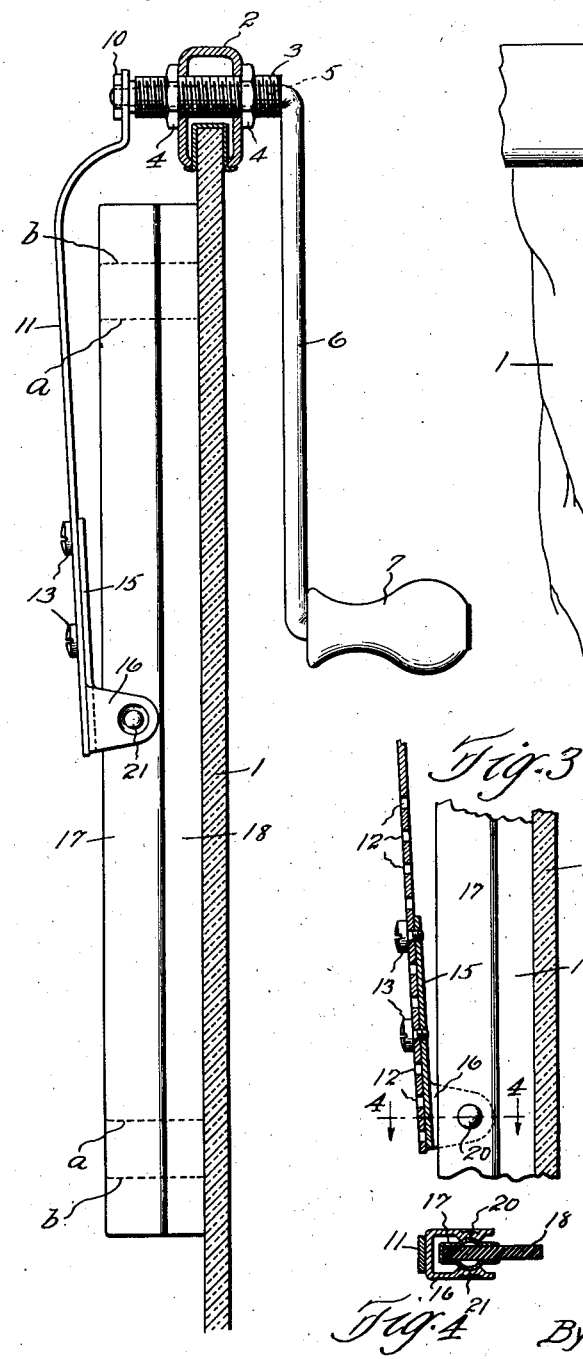
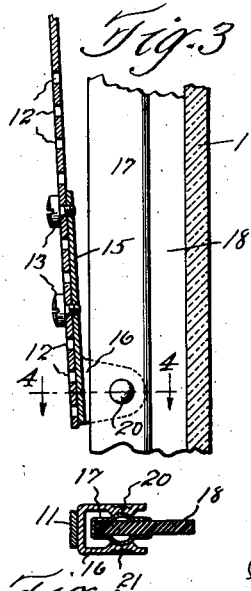
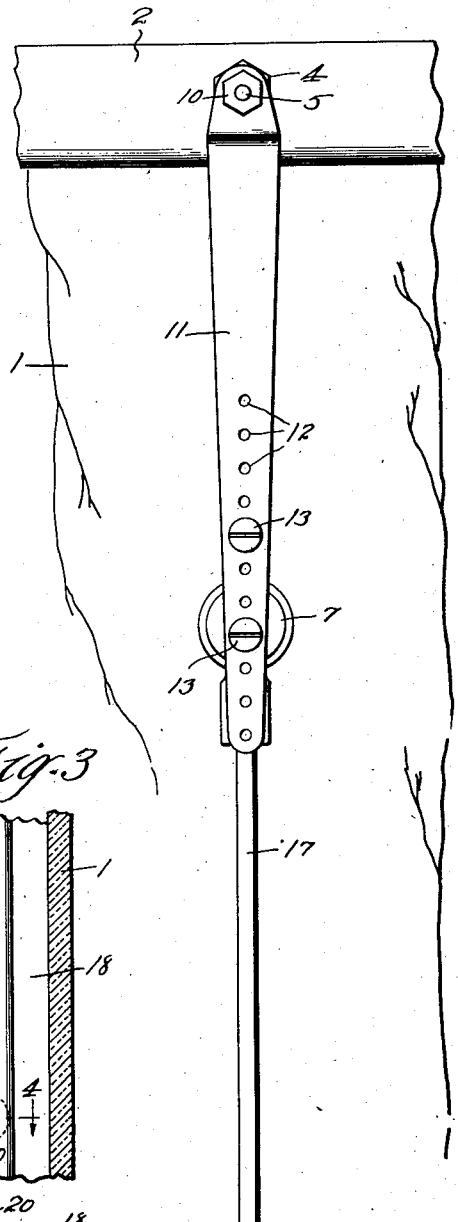
Inventor
Charles F. Laganke
By Hull, Brock & West
Attys.

Feb. 16, 1926.
C. F. LAGANKE
1,573,618
WINDSHIELD CLEANER
Filed Jan. 16, 1922
2 Sheets-Sheet 2
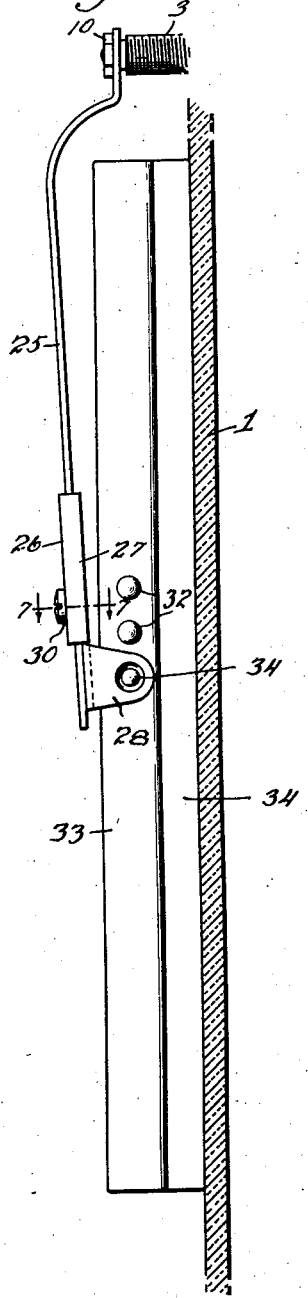
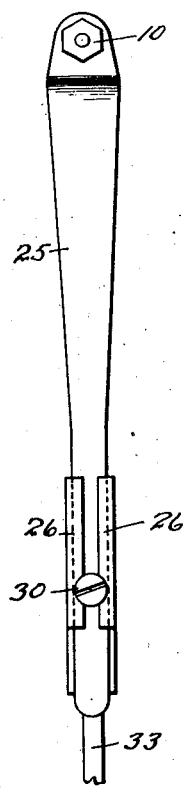
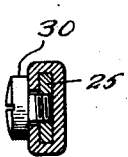
Inventor
Charles F. Laganke
By Shull, Brock & West
Attys.

Patented Feb. 16, 1926.

1,573,618

UNITED STATES PATENT OFFICE.

CHARLES F. LAGANKE, OF CLEVELAND, OHIO, ASSIGNOR TO THE OUTLOOK COMPANY, OF CLEVELAND, OHIO, A CORPORATION OF OHIO.

WINDSHIELD CLEANER.

Application filed January 16, 1922. Serial No. 529,610.

*To all whom it may concern:*

Be it known that I, CHARLES F. LAGANKE, a citizen of the United States, residing at Cleveland, in the county of Cuyahoga and State of Ohio, have invented a certain new and useful Improvement in Windshield Cleaners, of which the following is a full, clear, and exact description, reference being had to the accompanying drawings.

This invention relates to improvements in that class of devices known as windshield cleaners that are used for removing rain, snow, sleet, moisture and the like from the windshields of automobiles, motormen's windows of street cars, lookout windows of locomotive cabs, etc., my present improvements being more especially adapted for use in connection with the windshields of automobiles.

It is found in connection with automobile windshields that that portion of the pane through which the driver observes the road ahead, and consequently that part which it is desired to keep free from rain, snow, etc., varies quite considerably in its position with respect to the remainder of the windshield, and the vertical dimension of the pane differs materially in different types of cars, as, for instance, in the average sport model, the top, or sometimes only, pane is comparatively short in a vertical direction, while in other types of cars, especially the larger closed cars, the pane is of considerable vertical extent.

The essential object of my invention is to provide a windshield cleaner wherein the position of the wiper with respect to its carrying arm is adjustable, making it possible to shift the area of operation of the wiper on the windshield pane, so that a dealer is not required to stock such a great variety of sizes of cleaners in order to properly meet these various conditions.

More specifically, the objects of my invention are to provide a windshield cleaner having a wiper carrying arm that is adjustable in length; and to provide a device of the aforesaid character which is strong and durable, simple of construction, economical of production, and convenient of adjustment and use.

The foregoing objects, and others which will appear as this description proceeds, are attained in the embodiments of the invention illustrated in the drawings accompanying and forming a part hereof and wherein Fig. 1 is a vertical section through a windshield showing my improved cleaner in side elevation applied thereto; Fig. 2 is a fragmentary front elevation of the windshield equipped with the cleaner; Fig. 3 is a longitudinal section through the lower end of the wiper carrying arm, and includes fragments of the wiper and windshield pane; Fig. 4 is a section on the line 4—4 of Fig. 3; Fig. 5 is a view similar to but less complete than Fig. 1, showing a modified form of the arm; Fig. 6 is a front elevation of the arm shown in Fig. 5; and Fig. 7 is a sectional detail on the correspondingly numbered line of Fig. 5.

The pane of the windshield is designated 1 and the frame thereof is designated 2. An externally threaded bearing sleeve 3 is clamped within an aperture of the frame by nuts 4 that are applied to its opposite ends. A shaft 5 is journaled within the bearing sleeve and at its inner end has connection with an operating handle 6 that is equipped with a knob 7. In the present instance, the shaft and arm are formed of right angularly related portions of a rod, the free end of the rod being directed inwardly to provide a support for the knob 7.

At its outer end, the shaft 5 has secured to it, as by means of a nut 10, a wiper arm 11 which is preferably formed of spring material and its outer end portion is provided with a series of apertures 12 through which screws 13 are passed for threaded engagement within apertures of the shank 15 of a yoke 16 which embraces the metal sheath 17 of the wiper strip 18. The wiper strip is formed of rubber, or other suitable material. It will be seen, by reference to Figs. 3 and 4, that the sheath 17 is provided with a spherical portion 20 which is received by sockets 21 in the opposite branches of the yoke 16. By this arrangement the wiper is afforded universal movement with respect to the wiper carrying arm and is free to adjust itself to the varying plane of the windshield so that at all times it bears with equal pressure thereon from end to end and is permitted to flip from side to side as it is swung to and fro across the windshield pane when the shaft 5 is oscillated by means of the operating handle 6. By virtue of the series of apertures 12, the shank 15 of the yoke 16 may be adjusted along the arm 11 so as to raise or lower the wiper with respect to the upper edge of the pane, for reasons already related. To provide for panes of different vertical dimensions, I propose to supply wipers of different lengths such as indicated by the dotted lines occurring near the top and bottom ends of the wiper shown in Fig. 1, one length of wiper being indicated by the dotted lines, $a$, $a$ and another length by the dotted lines $b$, $b$. To substitute one length for another, it is only necessary to spread the branches of the yoke 15 sufficiently to disengage the sockets 21 from the spherical portion 20 of the wiper, reforming the yoke to its previous condition after the substitution has been made. While I have shown the wiper connected at its longitudinal center to the arm, this is not necessary, though it is regarded as desirable.

A modified form of the adjustable connection between the wiper arm and the wiper carrying yoke is illustrated in Figs. 5, 6, and 7. Here, the lower end of the wiper carrying arm 25 is formed with parallel sides, and embracing this portion of the arm are forwardly and inwardly turned flanges 26 that extend along the opposite side edges of the shank 27 of the yoke 28. A screw 30 is threaded into an aperture of the arm 25 and its head overlies the flanges 26 so that by setting up tightly on the screw, said flanges may be clamped securely to the arm and the yoke 28 held thereby in any adjusted position with respect to the arm. In this as well as in the previous form of the invention I may provide for further adjustment by making a series of spherical portions 32 on the sheath 33 which supports the wiper strip 34 and with any one of which the socketed portions 35 of the yoke may be engaged.

Pursuing the usual practice, the bearing sleeve 3 may be supported in an aperture of the pane instead of in an opening in the frame, as herein illustrated, or the shaft 5 may be journaled in a suitable bracket applied to the windshield frame.

Having thus described my invention, what I claim is:—

1. In windshield cleaning apparatus, the combination of a resilient wiper carrying arm composed of two sections formed of sheet metal stampings and having flat overlapping portions, a headed screw passing through the overlapping portion of one of the sections and threaded into one of a plurality of spaced threaded openings in the other of the sections to clamp said overlapping portions together, a wiper supported by said arm in operative relation to the windshield pane, and means for actuating the arm to impart movement to the wiper.

2. In windshield cleaning apparatus, the combination of a resilient wiper carrying arm composed of two sections formed of sheet metal stampings and having flat overlapping portions, a headed screw threaded into one of the sections and adapted to clamp portions of the other section that are spaced apart longitudinally of said section between its head and the first mentioned section, a wiper supported by said arm in operative relation to the windshield pane, and means for actuating the arm to impart movement to the wiper.

In testimony whereof I hereunto affix my signature.

CHARLES F. LAGANKE.